(12) United States Patent  (10) Patent No.: US 8,779,667 B2
Nanahara et al.  (45) Date of Patent: Jul. 15, 2014

(54) ILLUMINATION APPARATUS

(75) Inventors: Atuo Nanahara, Kyoto (JP); Shinji Matsuda, Chiba (JP)

(73) Assignee: Panasonic Corporation, Osaka (JP)

( * ) Notice: Subject to any disclaimer, the term of this patent is extended or adjusted under 35 U.S.C. 154(b) by 125 days.

(21) Appl. No.: 13/529,174

(22) Filed: Jun. 21, 2012

(65) Prior Publication Data

US 2012/0326611 A1 Dec. 27, 2012

(30) Foreign Application Priority Data

Jun. 22, 2011 (JP) .................................. 2011-138512

(51) Int. Cl.
H05B 37/02 (2006.01)

(52) U.S. Cl.
USPC ............................ 315/151; 315/157; 315/308

(58) Field of Classification Search
USPC ......... 315/149–159, 291, 294, 297, 307, 308, 315/312
See application file for complete search history.

(56) References Cited

U.S. PATENT DOCUMENTS

| | | | |
|---|---|---|---|
| 7,956,839 | B2 | 6/2011 | Lin |
| 8,581,974 | B2 * | 11/2013 | Lin et al. .......................... 348/94 |
| 2006/0029256 | A1 | 2/2006 | Miyoshi et al. |
| 2009/0085486 | A1 | 4/2009 | Lin |
| 2011/0115910 | A1 | 5/2011 | Brackney |
| 2012/0013257 | A1 * | 1/2012 | Sibert .......................... 315/152 |
| 2012/0091901 | A1 * | 4/2012 | Tanigawa et al. ............. 315/158 |
| 2012/0286672 | A1 * | 11/2012 | Holland et al. ............... 315/154 |

FOREIGN PATENT DOCUMENTS

| | | |
|---|---|---|
| CN | 101400201 A | 4/2009 |
| CN | 101662861 A | 3/2010 |
| CN | 102098836 A | 6/2011 |
| EP | 1 408 276 | 4/2004 |
| JP | 2002-134282 | 5/2002 |
| JP | 2002-289377 | 10/2002 |
| JP | 2003-215665 | 7/2003 |
| JP | 2004-280379 | 10/2004 |
| JP | 2006-54504 | 2/2006 |
| JP | 2011-49004 | 3/2011 |
| WO | 03/098977 | 11/2003 |
| WO | 2010/010493 | 1/2010 |
| WO | 2010/100586 | 9/2010 |

OTHER PUBLICATIONS

European Search Report for corresponding European Application No. 12172942 dated Oct. 25, 2012.
Office Action in corresponding Chinese Application No. 201210212216.5 dated Mar. 28, 2014 and English translation.

* cited by examiner

*Primary Examiner* — Tung X Le
(74) *Attorney, Agent, or Firm* — Renner, Otto, Boisselle & Sklar, LLP

(57) ABSTRACT

An illumination apparatus includes a light source; a sensor which has an image sensor and detects an illuminance and a presence of a human based on a captured image while setting a range overlapping a range illuminated by the light source as a visual field; an illuminance determining unit for varying a light output from the light source based on the illuminance and the presence of a human; and a dimming control unit. The illuminance determining unit obtains an illuminance of an illuminance maintaining area included in the visual field based on the captured image, and when the sensor detects no human, the illuminance determining unit reduces the light output while maintaining the illuminance of the illuminance maintaining area to be equal to or greater than a threshold that is set in advance as a lower limit illuminance, which makes it feasible for the image sensor to capture an image.

4 Claims, 6 Drawing Sheets

ILLUMINATION APPARATUS

FIELD OF THE INVENTION

The present invention relates to an illumination apparatus which detects an illuminance and a presence or absence of a human by using an image sensor, and controls a light output from a light source based on the detection results.

BACKGROUND OF THE INVENTION

Conventionally, there has been provided an illumination apparatus which detects an illuminance and a presence or absence of a human by using an image sensor, and controls a light output from a light source based on the detection results (see, e.g., Japanese Patent Application Publication No. 2002-289377).

The illumination apparatus described in Japanese Patent Application Publication No. 2002-289377 includes a TV camera (image sensor) using a charge coupled device (CCD), a complementary metal oxide semiconductor (CMOS) or the like, and detects the illuminance and the presence or absence of a human on the basis of an image captured by the image sensor. This illumination apparatus controls the light output from the light source based on the detected illuminance if a human presence is detected, and turns off the light source if no human presence is detected. In this way, the illumination apparatus turns off the light source when no human is present to thereby suppress a power consumption.

However, if the light source is turned off, e.g., at night time at which a light (e.g., external light) other than a light from the light source is not incident, it becomes difficult to ensure the illuminance required for the image sensor to capture an image. In this way, when the image sensor cannot capture an image, the detection of the presence or absence of a human by using the image cannot be accomplished.

SUMMARY OF THE INVENTION

In view of the above, the present invention provides an illumination apparatus capable of suppressing power consumption while maintaining a function of detecting a presence or absence of a human.

In accordance with an embodiment of the present invention, there is provided an illumination apparatus including: a light source; a sensor which has an image sensor and detects an illuminance and a presence or absence of a human based on an image captured with the image sensor while setting a range overlapping a range illuminated by the light source as a visual field; an illuminance determining unit which generates a dimming signal to give instructions to vary a light output from the light source based on the illuminance and the presence or absence of a human provided from the sensor; and a dimming control unit which controls the light output from the light source in response to the dimming signal from the illuminance determining unit.

The illuminance determining unit obtains an illuminance of an illuminance maintaining area included in the visual field based on the image captured with the image sensor, and when the sensor detects that no human is present, the illuminance determining unit reduces the light output from the light source while maintaining the illuminance of the illuminance maintaining area to be equal to or greater than a threshold that is set in advance as a lower limit illuminance which makes it feasible for the image sensor to capture an image.

Further, the visual field may include two or more illuminance maintaining areas, and when the sensor detects that no human is present, the illuminance determining unit may maintain illuminances for all the illuminance maintaining areas to be equal to or greater than the threshold.

Further, when the sensor detects that no human is present, the illuminance determining unit may obtain a prediction illuminance of the illuminance maintaining area in case of reducing the light output from the light source by a predetermined value set in advance, and if the prediction illuminance is equal to or greater than the threshold, the illuminance determining unit may reduce the light output from the light source by the predetermined value.

Further, the visual field may include two or more illuminance maintaining areas, and when the sensor detects that no human is present, the illuminance determining unit may obtain a prediction illuminance of each of the illuminance maintaining areas in case of reducing the light output from the light source by a predetermined value set in advance. If the prediction illuminances for all the illuminance maintaining areas are equal to or greater than the threshold, the illuminance determining unit may reduce the light output from the light source by the predetermined value.

In accordance with the present invention, there is an effect of suppressing power consumption while maintaining a function of detecting the presence or absence of a human

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 2:
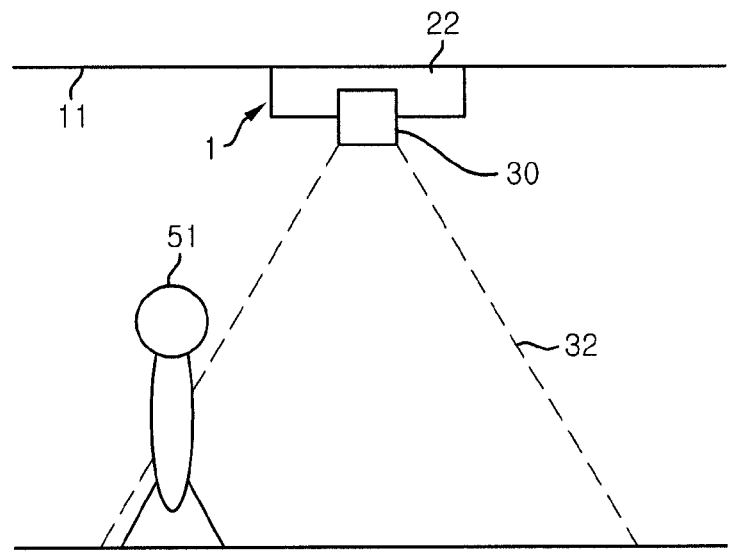
FIG. 2 shows an example of installation of the illumination apparatus in accordance with the embodiment of the present invention.

Hereinafter, a lighting fixture 1 including a fixture body 22 formed integrally with a sensor 30 as shown in FIG. 2 will be described as an example of an illumination apparatus. The lighting fixture 1 of the present embodiment is installed on a ceiling 11 of a room such as an office. All or a part of the room is set as an illumination range, and a presence or absence of a human and the illuminance in the illumination range are detected with the sensor 30.

If the sensor 30 determines that no human is present, the lighting fixture 1 reduces a light output from a light source 21 on the basis of the detected illuminance while maintaining the sensor 30's function of detecting the presence or absence of a human. Accordingly, the lighting fixture 1 can achieve an energy saving by suppressing the unnecessary power consumption.

Figure 1:
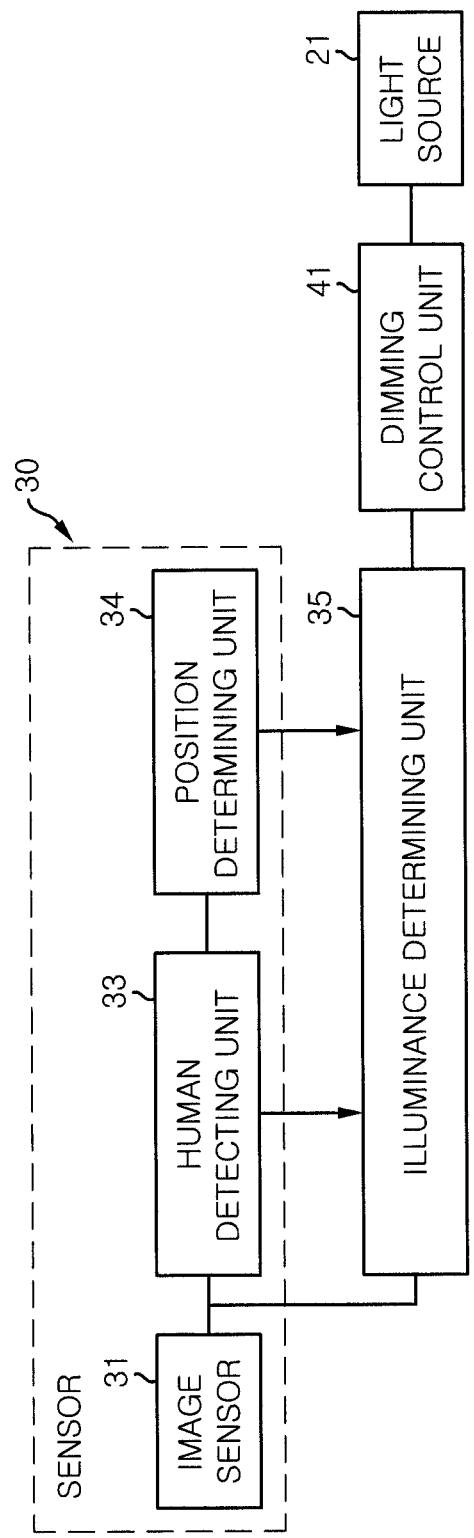
FIG. 1 is a block diagram illustrating an illumination apparatus in accordance with an embodiment of the present invention.

As shown in FIG. 1, the sensor 30 includes an image sensor 31 having an area type image sensor such as a CCD or a CMOS image sensor and an image-capturing optics (not shown), and captures an image of a visual field 32 (see FIG. 2) defined by the image-capturing optics.

The image sensor 31 of this embodiment generates a gray-scale image of the visual field 32. Therefore, the image sensor 31 can calculate the illuminance of the image by using a gray value of each pixel of the captured image. As shown in FIG. 2, the sensor 30 is installed at the ceiling 11 to face downward toward the center of the field of view such that the visual field 32 overlaps with the illumination range of the lighting fixture 1. The sensor 30 captures an image of about 30 frames per second.

Figure 3:
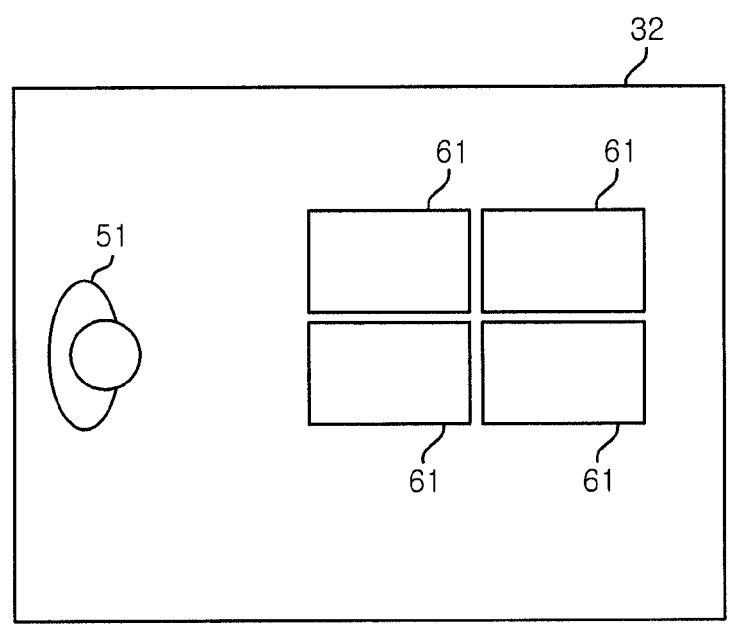
FIG. 3 show a range captured by an image sensor of the illumination apparatus in accordance with the embodiment of the present invention.

FIG. 3 shows the visual field 32 captured with the sensor 30 installed on the ceiling 11, which is seen from the ceiling 11, and shows a case where a human 51 and a desk 61 are located in the visual field 32.

The sensor 30 further includes a human detecting unit 33 and a position determining unit 34 which respectively detect and determine the movement of a human and the position of a human based on the captured image. In other words, the sensor 30 of this embodiment is a human detecting sensor using the visual field 32 as a detection range, and detects the presence or absence of a human, the illuminance and the position of a human.

Each of the human detecting unit 33 and the position determining unit 34 is realized by a storage unit including a volatile memory such as a double data rate random access memory (DDRRAM) and a non-volatile memory such as an electrically erasable and programmable ROM (EEPROM), and a control unit including a digital signal processor (DSP), an advanced image processor or the like. The storage unit is used to store a program required for the operation of the sensor 30 and image data of a background image and the like which will be described later, and to temporarily save a calculated value and the like. The control unit performs a process to realize the function of detecting the movement of a human or the function of detecting the position of a human based on the program stored in the storage unit. Further, the human detecting unit 33 and the position determining unit 34 may share the storage unit and the control unit, or the storage unit and the control unit may be included in each of the human detecting unit 33 and the position determining unit 34.

In addition, the lighting fixture 1 includes an illuminance determining unit 35 determining the ON/OFF of the light source 21 on the basis of the illuminance, the presence or absence of a human and the captured image provided by the sensor 30, and a dimming control unit 41 controlling the light output from the light source 21 in response to the instructions from the illuminance determining unit 35. The illuminance determining unit 35 generates a dimming signal for adjusting the light output from the light source 21 based on the illuminance and the presence or absence of a human in the visual field 32 of the sensor 30. Then, the dimming control unit 41 controls the light output from the light source 21 in response to the dimming signal received from the illuminance determining unit 35.

The illuminance determining unit 35 is also realized by a storing unit and a control unit. The illuminance determining unit 35 may share the storing unit and the control unit with the human detecting unit 33 and the position determining unit 34, or may be configured to have a storing unit and a control unit provided separately.

The lighting fixture 1 has two operation modes, i.e., a setting mode to obtain the background image for use in the detection of a human, and a normal operation mode to control the light output from the light source 21 through the detection of a human.

In the normal operation mode, the sensor 30 detects a human with the human detecting unit 33 which regards a change in the visual field 32 of the sensor 30 as an intrusion (human).

The human detecting unit 33 detects a human by using the background image stored in the storing unit. The captured image obtained in a state where no human is present in the visual field 32 of the sensor 30 is used as the background image. The human detecting unit 33 uses a difference image between the background image and the captured image acquired by the image sensor 31 to detect a human presence, and provides the result of the presence or absence of a human in the visual field 32 to the illuminance determining unit 35.

In each image, referring to FIG. 4 as an example, a pixel in an upper left corner has coordinates (0, 0), wherein a right direction is referred to as an x direction, and a downward direction is referred to as a y direction. In the following description, the coordinates of each pixel are expressed in the form of (x, y). For example, coordinates (0, 0) to (639, 479) may be assigned to the respective pixels of an image having horizontal 640 pixels×vertical 480 pixels. Further, the same coordinates (x, y) are assigned to the pixels at the same position in the captured image, the background image and the difference image.

The difference image may be obtained by calculating a difference in the gray value of each pixel at the same position in the captured image and the background image. When no change substantially occurs in the pixel at the same position in the two images, the pixel in the difference image having the same coordinates as such pixel has a pixel value ideally equal to 0. On the other hand, when a change occurs due to a human intrusion or the like in the pixel at the same position in the two images, the pixel in the difference image having the same coordinates as such pixel has a pixel value ideally larger than a preset threshold value.

The human detecting unit 33 may use one captured image as the background image at all times, or may update the background image.

In a case where one captured image is used as the background image at all times, the background image is defined as a captured image which is acquired in a state where a human surely does not exist in the visual field 32 of the sensor 30 in the setting mode. The captured image is acquired, e.g., by capturing an image after the absence of a human in the visual field 32 is confirmed by human visual inspection, or by capturing an image in a time zone in which the absence of a human in the visual field 32 is guaranteed.

On the other hand, in case of updating the background image, for example, a difference image is created by comparing two sample images captured at a regular interval. If the total sum of pixel values of pixels in the difference image does not exceed a preset reference value, it is determined that there is no change between the two captured image frames (i.e., there is no human). If such determination that there is no change between two image frames has been made multiple times in succession, it is considered that there is no human in the visual field 32 of the sensor 30, and the one that has been captured later among the two captured images is updated as the background image. A sampling interval is set appropriately, and for example is set to a few seconds.

In the case where one captured image is used as the background image at all times, no processing is required to update the background image in the normal operation mode, and a processing load of the human detecting unit 33 is reduced. However, in this case, even when a change has occurred in the visual field 32 of the sensor 30 due to a cause other than the human intrusion (for example, when a desk has been moved), it may be determined that the human intrusion is detected. On the other hand, in the case of updating the background image, even if a change has occurred due to a cause other than the human intrusion (e.g., moving the desk), the possibility of false detection (detecting a non-human as a human) is reduced since such change is regarded as a part of the background. Thus, it is preferable that the background image is updated in a timely manner.

Figure 4A:
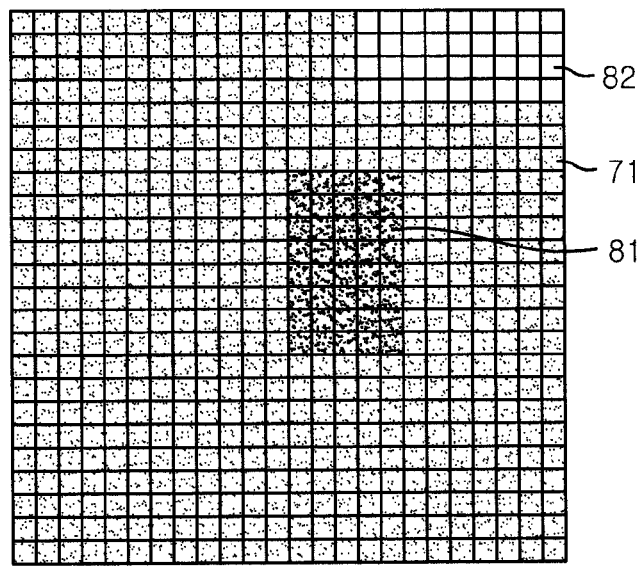
FIGS. 4A to 4C show how to acquire a difference image of an image captured by the image sensor of the illumination apparatus in accordance with the embodiment of the present invention.
Figure 4B:
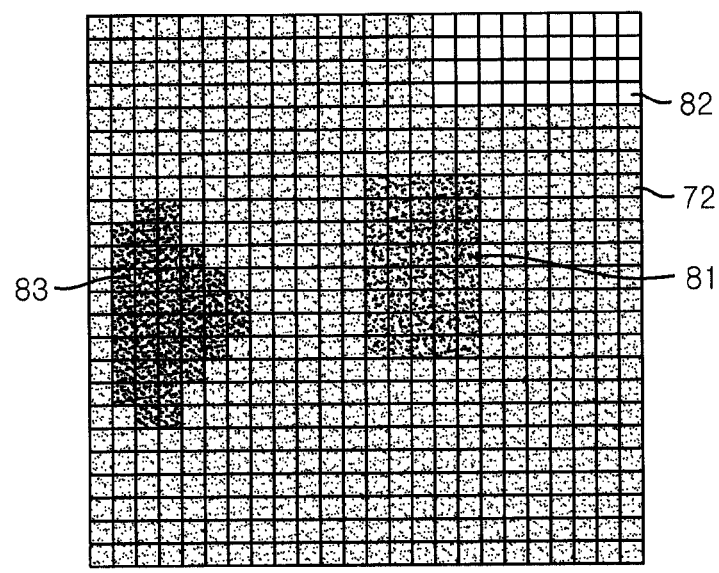
Figure 4C:
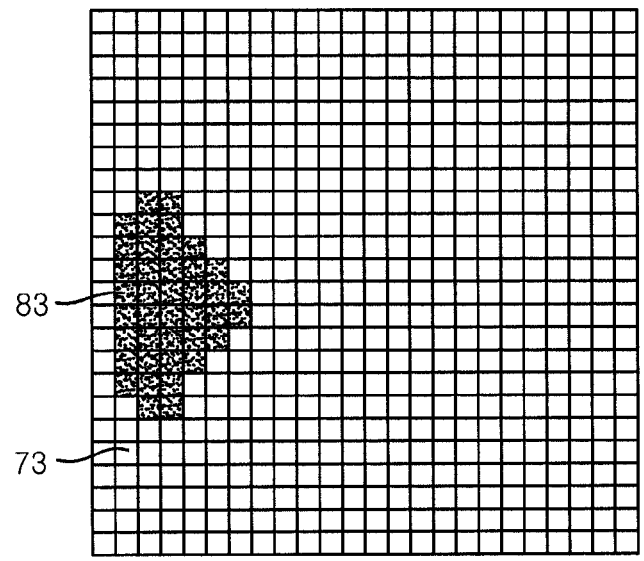

Generally, in the normal operation mode, the human detecting unit 33 generates a difference image 73 (see FIG. 4C) between a background image 71 (see FIG. 4A) obtained by the above-mentioned processing and a captured image 72 (see FIG. 4B) acquired by the sensor 30. It is assumed that the background image 71 includes a first object 81 and a second object 82 as shown in FIG. 4A, and the captured image 72 includes the first object 81, the second object 82 and a third object 83 as shown in FIG. 4B.

Therefore, the human detecting unit 33 detects that a human is present in the visual field 32 of the sensor 30 if the size of a connected pixel group including pixels each having an absolute pixel value greater than a threshold value in the difference image 73 is equal to or greater than a reference value. The connected pixel group is a set of, e.g., 4 (or 8 or more) pixels connected to each other, wherein each pixel has an absolute pixel value greater than the threshold value. Furthermore, in addition to the size of the connected pixel group, the sum of the respective absolute pixel values of the entire pixels in the connected pixel group is compared to a preset reference value to see whether the sum is equal to or greater than the preset reference value, and such comparison may be included in the conditions for detecting the presence or absence of a human.

Next, there will be described a process of determining the position of a human in the normal operation mode.

To every predetermined processing frames, selected at a preset interval of, e.g., a few seconds, the human detecting unit 33 assigns difference images to the position determining unit 34. As described above, the human intrusion into the visual field 32 of the sensor 30 is indicated by the connected pixel group including pixels each having an absolute pixel value equal to or greater than the threshold value in the difference image. The position determining unit 34 calculates and stores position coordinates (x, y) of a representative point in the connected pixel group to identify the location of the connected pixel group in the difference image. As an example of the representative point of the connected pixel group, a center of the connected pixel group, an intersection of diagonal lines of a bounding rectangle of the connected pixel group, each vertex of the bounding rectangle of the connected pixel group or the like may be used. As for the center of the connected pixel group, an average of the coordinates of the respective pixels of the connected pixel group is used.

Figure 5:
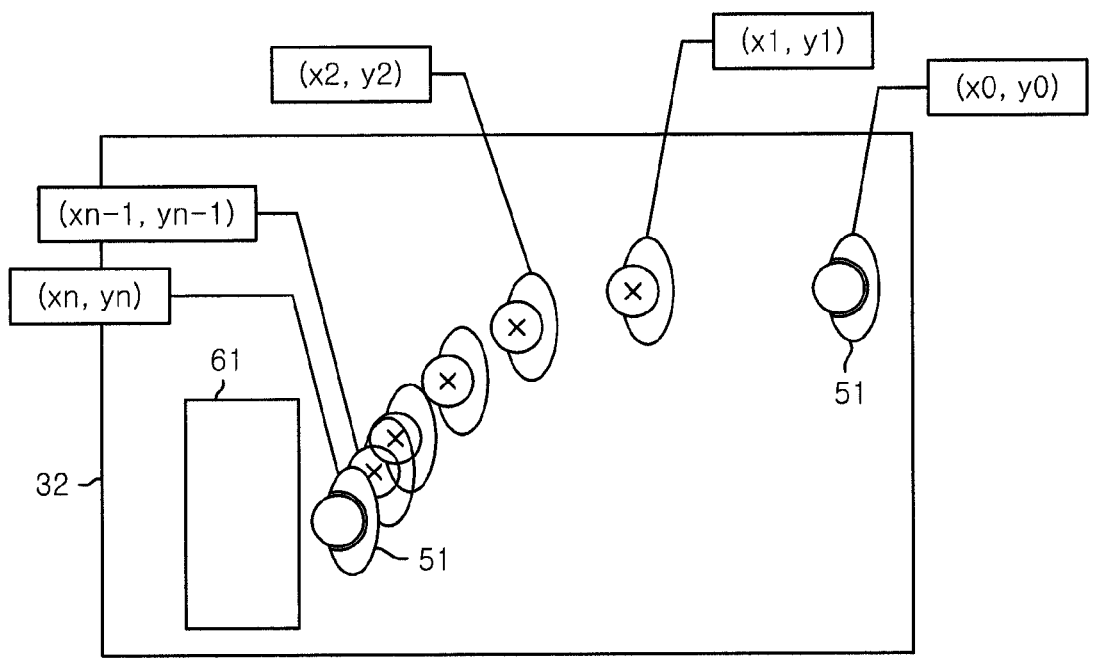
FIG. 5 shows a movement of a human in a visual field of the sensor of the illumination apparatus in accordance with the embodiment of the present invention.

As shown in FIG. 5, the position coordinates of the human 51 are (x0, y0) at the beginning of detecting the human intrusion in the visual field 32 of the sensor 30. Further, the position coordinates of the human 51 during the movement toward the desk 61 have changed from (x1, y1) to (xn−1, yn−1), and the position coordinates of the human 51 when being seated at the desk 61 have been detected as (xn, yn). A travel distance of the human 51 between adjacent processing frames (distance between (xm, ym) and (xm−1, ym−1) if m is a certain time point at which the processing frame is present) is large while the human 51 is moved toward the desk 61 and becomes smaller after sitting. Accordingly, when a preset specified time has elapsed while the travel distance (i.e., rate of change in position) remains less than a specified value set in advance, it is determined that the human 51 is stationary, and the position coordinates (x, y) of the human 51 in the corresponding processing frame are stored. Thus, the position determining unit 34 can obtain the position coordinates of the human in a stationary state.

Hereinafter, there will be described a control of the light output from the light source 21 based on the detection of the presence or absence of the human 51 by the sensor 30 in the normal operation mode. In this control, the illuminance determining unit 35 determines the dimming of the light source 21 based on the illuminance and the presence or absence of a human provided from the sensor 30.

First, if the sensor 30 detects the presence of the human 51, the light output from the light source 21 is controlled to be a light output (represented by L1 in FIG. 6) set in advance depending on the intended use. In the following description, a state where the light source 21 is turned on at the light output L1 is referred to as a normal lighting state. While the sensor 30 detects the presence of the human 51, the light source 21 is maintained in the normal lighting state. On the other hand, from the time when the sensor 30 no longer detects the presence of the human 51, the light output from the light source 21 is reduced while maintaining the illuminance at a level that makes it feasible for the image sensor 31 to capture an image.

The illuminance determining unit 35 stores in advance a threshold (see a dashed dotted line shown in FIG. 7) that is a lower limit of the illuminance making it feasible for the image sensor 31 to capture an image. The threshold is used to determine whether or not the illuminance in the visual field 32 of the sensor 30 is maintained at a level that makes it feasible for the image sensor 31 to capture an image.

The illuminance determining unit 35 sets all or a part of the visual field 32 of the sensor 30 as an illuminance maintaining area. The illuminance maintaining area is used to obtain an illuminance which serves to determine whether or not the illuminance in the visual field 32 of the sensor 30 is maintained at a level that makes it feasible for the image sensor 31 to capture an image. When the illuminance maintaining area is set in a part of the visual field 32 of the sensor 30, a plurality of the illuminance maintaining areas may be set in the visual field 32 of the sensor 30.

A peripheral portion of the captured image is likely to have a gray value lower than that in a central portion due to shading by the image-capturing optics. If the illuminance is reduced, an image at the peripheral portion may be captured the first one that cannot be captured. Further, since the human intrusion is first detected from the outside of the visual field 32 of the sensor 30, the peripheral portion corresponding to the outside of the visual field 32 of the sensor 30 in the captured image needs to be captured to detect the human intrusion. Accordingly, if the illuminance maintaining area is set in a part of the visual field 32 of the sensor 30, it is desirable that the illuminance maintaining area is set in a range corresponding to the peripheral portion of the captured image in the visual field 32. In addition, it is preferable that the illuminance maintaining area is also set at a place where the human 51 is likely to be in a stationary state such as a place near the desk 61 in the visual field 32 of the sensor 30.

The illuminance determining unit 35 calculates an average gray value of pixels corresponding to the illuminance maintaining area in the captured image (hereinafter referred to as "illuminance value of the illuminance maintaining area"). If the illuminance value of the illuminance maintaining area is equal to or greater than the threshold, the illuminance determining unit 35 determines that the image sensor 31 can capture an image at the light output from the light source 21 at that time, i.e., the sensor 30 can detect the presence or absence of the human 51.

The light output from the light source 21 is controlled by changing a supply of the power from the dimming control unit 41. The light source 21 may be configured so as to perform, in response to the change of the supply of the power, a gradual dimming from the normal lighting state all the way to a turned-off state (see L0 shown in FIG. 6), or so as to perform the gradual dimming from the normal lighting state, but not all the way to the turned-off state. In case where the light source 21 is dimmed gradually, but not all the way to the turned-off state, the light source 21 can be dimmed gradually only until a lighting state at a lower limit light output determined depending on the light source 21 (hereinafter referred to as "lower limit lighting state") from the normal lighting state. In the lower limit lighting state, the light source 21 is turned on at a light output L3 shown in FIG. 8. Hereinafter, each case will be described.

First, a case where the light source 21 can be dimmed gradually from the normal lighting state to the turned-off state will be described as an example shown in FIGS. 6 and 7. In this example, only one illuminance maintaining area is set.

Figure 6:
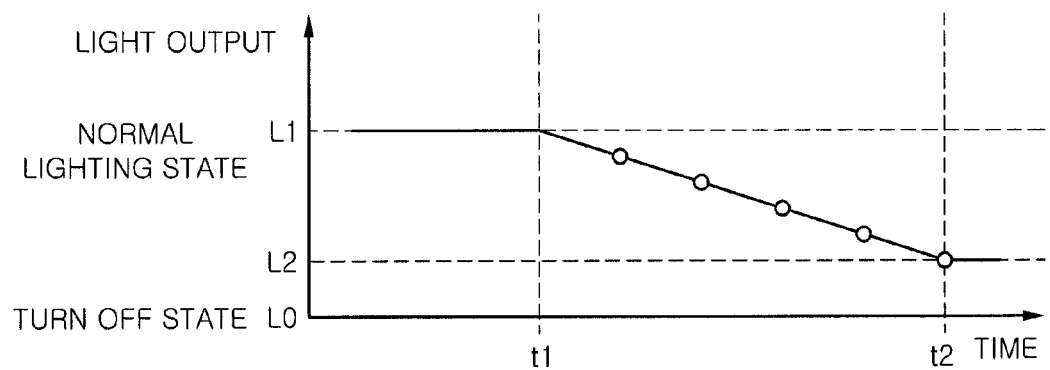
FIG. 6 is a graph showing a light output from a light source.

FIG. 6 illustrates a change of the light output from the light source 21. While the sensor 30 detects the presence of the human 51 (until t1 shown in FIG. 6), the light source 21 maintains the normal lighting state (L1 shown in FIG. 6). Then, from a time point (t1 shown in FIG. 6) when the sensor 30 no longer detects the presence of the human 51, the light output from the light source 21 is reduced gradually (t1~t2 shown in FIG. 6).

Figure 7:
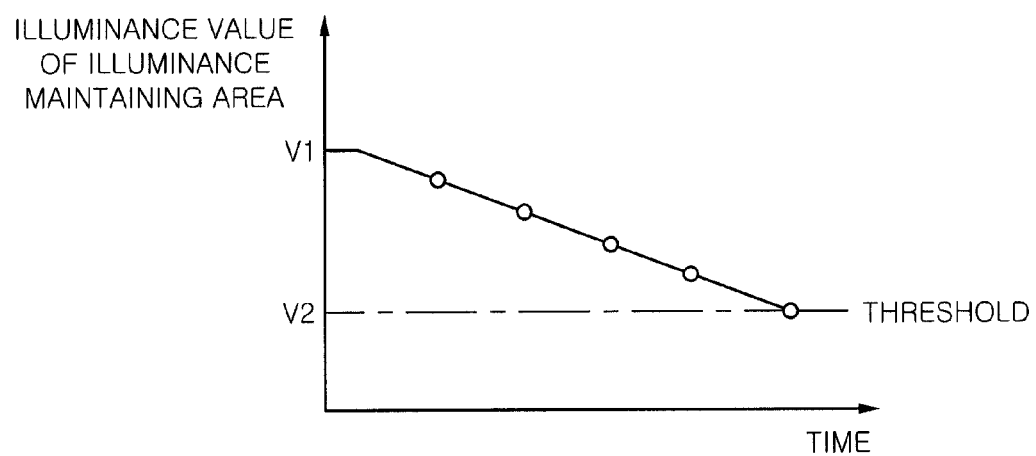
FIG. 7 is a graph showing an illuminance value of an illuminance maintaining area.

FIG. 7 shows a change of the illuminance value of the illuminance maintaining area (solid line shown in FIG. 7). If the light source 21 is in the normal lighting state, the illuminance value of the illuminance maintaining area is a constant illuminance value (V1 shown in FIG. 7) which makes it feasible for the image sensor 31 to capture an image.

Here, if the light output from the light source 21 is reduced gradually, the illuminance value of the illuminance maintaining area is also reduced gradually. At this time, the illuminance determining unit 35 calculates the illuminance value of the illuminance maintaining area (see white circles shown in FIG. 7) whenever the light output from the light source 21 is reduced by a predetermined value set in advance (see white circles shown in FIG. 6), and compares the illuminance value of the illuminance maintaining area with the threshold V2 (dashed dotted line shown in FIG. 7). As a result of the comparison, if the illuminance value of the illuminance maintaining area exceeds the threshold V2, the light output from the light source 21 is further reduced. Further, it is desirable that the predetermined value is the smallest unit at which the light output from the light source 21 can be reduced.

If the illuminance value of the illuminance maintaining area reaches the threshold V2, the light output from the light source 21 is fixed (L2 shown in FIG. 6). In this case, the threshold V2 becomes a lower limit illuminance value of the illuminance maintaining area. At this time, the light source 21 is able to maintain the light output at a level that makes it feasible for the image sensor 31 to capture an image, and the sensor 30 can detect the presence or absence of the human 51 in the visual field 32. Thus, it is possible to suppress the power consumption while maintaining the illuminance at a level that makes it feasible for the sensor 30 to detect the presence or absence of the human 51.

Further, as a result of comparing the illuminance value of the illuminance maintaining area with the threshold, if the illuminance value of the illuminance maintaining area is smaller than the threshold V2, the light output from the light source 21 is restored to the light output at a time of the previous comparison, and the illuminance value of the illuminance maintaining area is maintained to be greater than the threshold V2 and close to the threshold V2, preferably, to the lower limit illuminance value that is a minimum value greater than the threshold V2. Further, if the illuminance of the illuminance maintaining area is maintained to be equal to or greater than the threshold V2 due to an external light even though the light source is turned off, it goes without saying that the light output can be reduced to L0.

Further, if there are multiple illuminance maintaining areas in the captured image of the image sensor 31, the illuminance determining unit 35 calculates the illuminance value of each illuminance maintaining area. From a time point (t1 shown in FIG. 6) when the sensor 30 no longer detects the presence of the human 51, the light output from the light source 21 is reduced, and the illuminance value of each illuminance maintaining area is compared with the threshold V2. If the illuminance values of all illuminance maintaining areas are greater than the threshold, the light output from the light source 21 is further reduced. Further, if a minimum value among the illuminance values of the multiple illuminance maintaining areas reaches the threshold, the light output from the light source 21 is fixed. Further, if any one among the illuminance values of the multiple illuminance maintaining areas becomes smaller than the threshold, the light output from the light source 21 is restored to the light output at a time of the previous comparison. Thus, the illuminance value of each illuminance maintaining area is maintained to be equal to or greater than the threshold, and it is possible to suppress the power consumption while maintaining the illuminance at a level that make it feasible for the sensor 30 to detect the presence or absence of the human 51.

Figure 8:
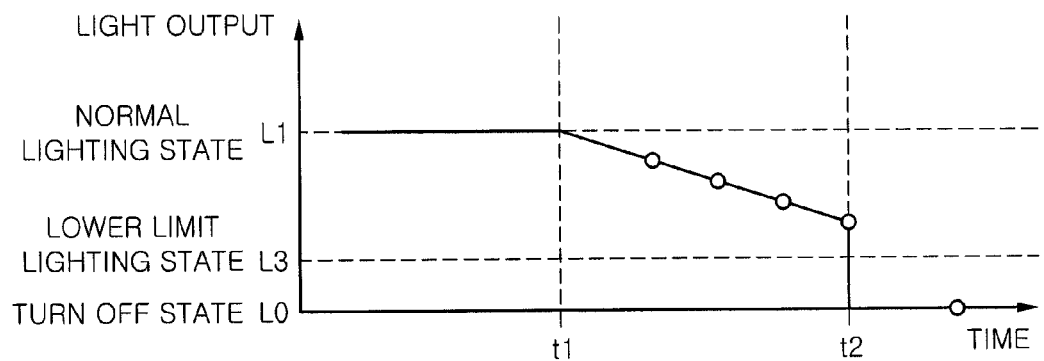
FIG. 8 is a graph showing a light output from a light source.

Next, a case where the light source 21 can be dimmed gradually only from the normal lighting state to the lower limit lighting state will be described as an example shown in FIGS. 8 and 9. In this case, in order to make the light output from the light source 21 lower than that in the lower limit lighting state, the light source 21 is turned off (L0 shown in FIG. 8). In this example, only one illuminance maintaining area is set.

First, in the setting mode, in a state where the external light is not incident (preferably, e.g., at night), the illuminance value of the illuminance maintaining area from the captured image of the image sensor 31 in the lower limit lighting state is calculated in advance and stored as an illuminance value of a dimming lower limit.

In the normal operation mode, the sensor 30 detects the presence of the human 51, and while the light source 21 is in the normal lighting state (L1 shown in FIG. 8), the illuminance value of the illuminance maintaining area is a constant illuminance value (V1 shown in FIG. 9) which makes it feasible for the image sensor 31 to capture an image. Then, from a time point (t1 shown in FIG. 8) when the sensor 30 no longer detects the presence of the human 51, the light output from the light source 21 is reduced gradually (t1~t2 shown in FIG. 8), and the illuminance value of the illuminance maintaining area is also reduced gradually. At this time, the illuminance determining unit 35 calculates the illuminance value of the illuminance maintaining area (see white circles shown in FIG. 9) whenever the light output from the light source 21 is reduced by a predetermined value (see white circles shown in FIG. 8), and compares the illuminance value of the illuminance maintaining area with the threshold V2 (dashed dotted line shown in FIG. 7).

When or before the light output from the light source 21 reaches the lower limit lighting state (L3 shown in FIG. 8), if the illuminance value of the illuminance maintaining area reaches the threshold V2, the light output from the light source 21 is fixed. At this time, the light source 21 is able to maintain the light output at a level that makes it feasible for the image sensor 31 to capture an image, and the sensor 30 can detect the presence or absence of the human 51 in the visual field 32. Thus, it is possible to suppress the power consumption while maintaining the illuminance at a level that makes it feasible for the sensor 30 to detect the presence or absence of the human 51.

Figure 9:
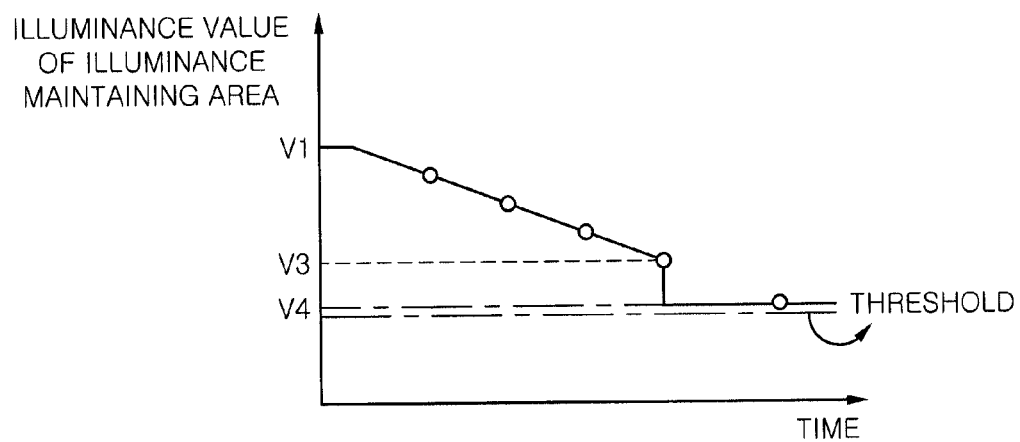
FIG. 9 is a graph showing an illuminance value of an illuminance maintaining area.

On the other hand, when the light output from the light source 21 reaches the lower limit lighting state (L3 shown in FIG. 8) before the illuminance value of the illuminance maintaining area reaches the threshold V2, the illuminance value of the illuminance maintaining area at that time point becomes a level of V3, as shown in FIG. 9.

Here, the illuminance determining unit 35 calculates a prediction illuminance value at that time point, which is an illuminance that can be obtained from a light (e.g., the external light) other than the light from the light source 21, by subtracting the stored illuminance value of the dimming lower limit from the illuminance value V3 of the illuminance maintaining area. Accordingly, an illuminance value of the illuminance maintaining area at the time after the light output from the light source 21 is reduced (turned off in this example) from the illuminance value V3 of the illuminance maintaining area in the lower limit lighting state of the light source 21 is calculated as the prediction illuminance value. The illuminance determining unit 35 compares the prediction illuminance value (see V4 shown in FIG. 9) with the threshold V2 (dashed dotted line shown in FIG. 9).

If the prediction illuminance value V4 is equal to or greater than the threshold V2, the illuminance value of the illuminance maintaining area can be maintained to be equal to or greater than the threshold V2 due to a light such as the external light even though the light source 21 is turned off. In other words, even if the light source 21 is turned off, the image sensor 31 can capture an image, and it is possible to detect the presence or absence of the human 51 in the visual field 32 of the sensor 30. Accordingly, in the above case, the illuminance determining unit 35 generates a dimming signal for reducing (turning off in the illustrated example) the light output from the light source 21 and applies the dimming signal to the dimming control unit 41, and the dimming control unit 41 turns off the light source 21 (after t2 shown in FIG. 8).

On the other hand, if the prediction illuminance value is less than the threshold, the light source 21 is maintained in the lower limit lighting state to maintain the illuminance value of the illuminance maintaining area to be equal to or greater than the threshold, and in order for the sensor 30 to detect the presence or absence of a human. Thus, it is possible to suppress the power consumption while maintaining the illuminance at a level that makes it feasible for the sensor 30 to detect the presence or absence of the human 51.

Further, although a case where the light source 21 is turned off from the lower limit lighting state has been described, when reducing the light output from the light source 21 at a certain interval from the normal lighting state until the lower limit lighting state (L1~L3 shown in FIG. 8), the light output from the light source 21 may be reduced after calculating the prediction illuminance value.

Further, if there are multiple illuminance maintaining areas in the captured image, the illuminance determining unit 35 calculates the illuminance value of each illuminance maintaining area. From a time point when the sensor 30 no longer detects the presence of the human 51, the light output from the light source 21 is reduced, and the illuminance value of each illuminance maintaining area is compared with the threshold. If the illuminance values of all illuminance maintaining areas are greater than the threshold, the light output from the light source 21 is further reduced.

Further, before the light output from the light source 21 reaches the lower limit lighting state, if a minimum value among the illuminance values of the multiple illuminance maintaining areas reaches the threshold, the light output from the light source 21 is fixed. Further, if any one among the illuminance values of the multiple illuminance maintaining areas is smaller than the threshold, the light output from the light source 21 is restored to the light output at a time of the previous comparison.

On the other hand, when the light output from the light source 21 reaches the lower limit lighting state, the illuminance value of each diming lower limit is subtracted from the illuminance value of each illuminance maintaining area to calculate the prediction illuminance value. If the prediction illuminance values for all illuminance maintaining areas are equal to or greater than the threshold, the light source 21 is turned off. If any prediction illuminance value for the illuminance maintaining area is less than the threshold, the light output from the light source 21 is maintained in the lower limit lighting state. Thus, the illuminance value of each illuminance maintaining area is maintained to be equal to or greater than the threshold, and it is possible to suppress the power consumption while maintaining the illuminance at a level that make it feasible for the sensor 30 to detect the presence or absence of the human 51.

In the above, there has been described the control of the light output from the light source 21 until the illuminance value of the illuminance maintaining area is stabilized at a level above the threshold after the transition from the state where the sensor 30 detects the presence of a human to the state where the sensor 30 detect that no human is present. However, even after the illuminance value of the illuminance maintaining area is stable at a level above the threshold, the light output from the light source 21 required to maintain the illuminance value of the illuminance maintaining area over the threshold may be changed due to, e.g., a change in the brightness of the external light or the like. In such a case, even after the illuminance value of the illuminance maintaining area is stable at a level above the threshold, it is preferable to detect the illuminance value of the illuminance maintaining area at all times, and control the light output from the light source 21 in response to the change of the external light or the like.

In addition, although the control of the light output from a single light source 21 has been described in this embodiment, the technique of the present invention is also applicable to a plurality of light sources 21. In this embodiment, the illumination apparatus has been described as an example of the lighting fixture 1 integrally including the light source 21 and the sensor 30, the illumination apparatus may be configured to separately include the light source 21 and the sensor 30.

While the invention has been shown and described with respect to the embodiments, it will be understood by those skilled in the art that various changes and modification may be made without departing from the scope of the invention as defined in the following claims.

What is claimed is:

1. An illumination apparatus comprising:
a light source;
a sensor which has an image sensor and detects an illuminance and a presence or absence of a human based on an image captured with the image sensor while setting a range overlapping a range illuminated by the light source as a visual field;
an illuminance determining unit which generates a dimming signal to give instructions to vary a light output from the light source based on the illuminance and the presence or absence of a human provided from the sensor; and
a dimming control unit which controls the light output from the light source in response to the dimming signal from the illuminance determining unit,
wherein the illuminance determining unit obtains an illuminance of an illuminance maintaining area included in the visual field based on the image captured with the image sensor, and when the sensor detects that no human is present, the illuminance determining unit reduces the light output from the light source while maintaining the illuminance of the illuminance maintaining area to be equal to or greater than a threshold that is set in advance as a lower limit illuminance which allows the image sensor to capture an image.

2. The illumination apparatus of claim 1, wherein the visual field includes two or more illuminance maintaining areas, and when the sensor detects that no human is present, the illuminance determining unit maintains illuminances for all the illuminance maintaining areas to be equal to or greater than the threshold.

3. The illumination apparatus of claim 1, wherein when the sensor detects that no human is present, the illuminance determining unit obtains a prediction illuminance of the illuminance maintaining area in case of reducing the light output from the light source by a predetermined value set in advance, and
wherein if the prediction illuminance is equal to or greater than the threshold, the illuminance determining unit reduces the light output from the light source by the predetermined value.

4. The illumination apparatus of claim 1, wherein the visual field includes two or more illuminance maintaining areas, and when the sensor detects that no human is present, the illuminance determining unit obtains a prediction illuminance of each of the illuminance maintaining areas in case of reducing the light output from the light source by a predetermined value set in advance, and
wherein if the prediction illuminances for all the illuminance maintaining areas are equal to or greater than the threshold, the illuminance determining unit reduces the light output from the light source by the predetermined value.

* * * * *